United States Patent

Kuroda

[11] Patent Number: 6,157,911
[45] Date of Patent: Dec. 5, 2000

[54] METHOD AND A SYSTEM FOR SUBSTANTIALLY ELIMINATING SPEECH RECOGNITION ERROR IN DETECTING REPETITIVE SOUND ELEMENTS

[75] Inventor: Masaru Kuroda, Kanagawa, Japan

[73] Assignee: Ricoh Company, Ltd., Tokyo, Japan

[21] Appl. No.: 09/049,371

[22] Filed: Mar. 27, 1998

[30] Foreign Application Priority Data

Mar. 28, 1997 [JP] Japan ................................. 9-095293

[51] Int. Cl.[7] ................................................ G10L 15/04
[52] U.S. Cl. ........................ 704/251; 704/241; 704/252; 704/239
[58] Field of Search ............................. 704/251, 252, 704/253, 254, 255, 231, 239, 241

[56] References Cited

U.S. PATENT DOCUMENTS

| 5,023,911 | 6/1991 | Gerson | 704/253 |
|---|---|---|---|
| 5,062,137 | 10/1991 | Watanabe et al. | 704/239 |
| 5,191,635 | 3/1993 | Fujimoto | 704/200 |
| 5,199,077 | 3/1993 | Wilcox et al. | 704/256 |
| 5,305,422 | 4/1994 | Junqua | 704/253 |
| 5,799,274 | 8/1998 | Kuroda | 704/239 |
| 5,974,381 | 10/1999 | Kubota | 704/253 |

FOREIGN PATENT DOCUMENTS

| 5-127696 | 5/1993 | Japan . |
|---|---|---|
| 6-43895 | 2/1994 | Japan . |

*Primary Examiner*—David R. Hudspeth
*Assistant Examiner*—Abul K. Azad
*Attorney, Agent, or Firm*—Knoble & Yoshida, LLC

[57] ABSTRACT

A method and a system substantially eliminates an erroneous voice recognition of repetitive elements in word spotting. One preferred embodiment according to the current invention eliminates erroneous voice recognition of repetitive elements by selectively prolonging a response time of words containing repetitive elements. In order to substantially eliminate the errors, in another preferred embodiment according to the current invention, words containing repetitive elements are marked by a silent key word.

9 Claims, 8 Drawing Sheets

| WORD | RESPONSE TIME |
|---|---|
| "zero" (ZERO) | 0.2 sec. |
| "ichi" (ONE) | 0.2 sec. |
| "ni" (TWO) | 0.2 sec. |
| "san" (THREE) | 0.2 sec. |
| "yon" (FOUR) | 0.2 sec. |
| "go" (FIVE) | 0.2 sec. |
| "roku" (SIX) | 0.2 sec. |
| "nana" (SEVEN) | 0.5 sec. |
| "hachi" (EIGHT) | 0.2 sec. |
| "ku" (NINE) | 0.2 sec. |

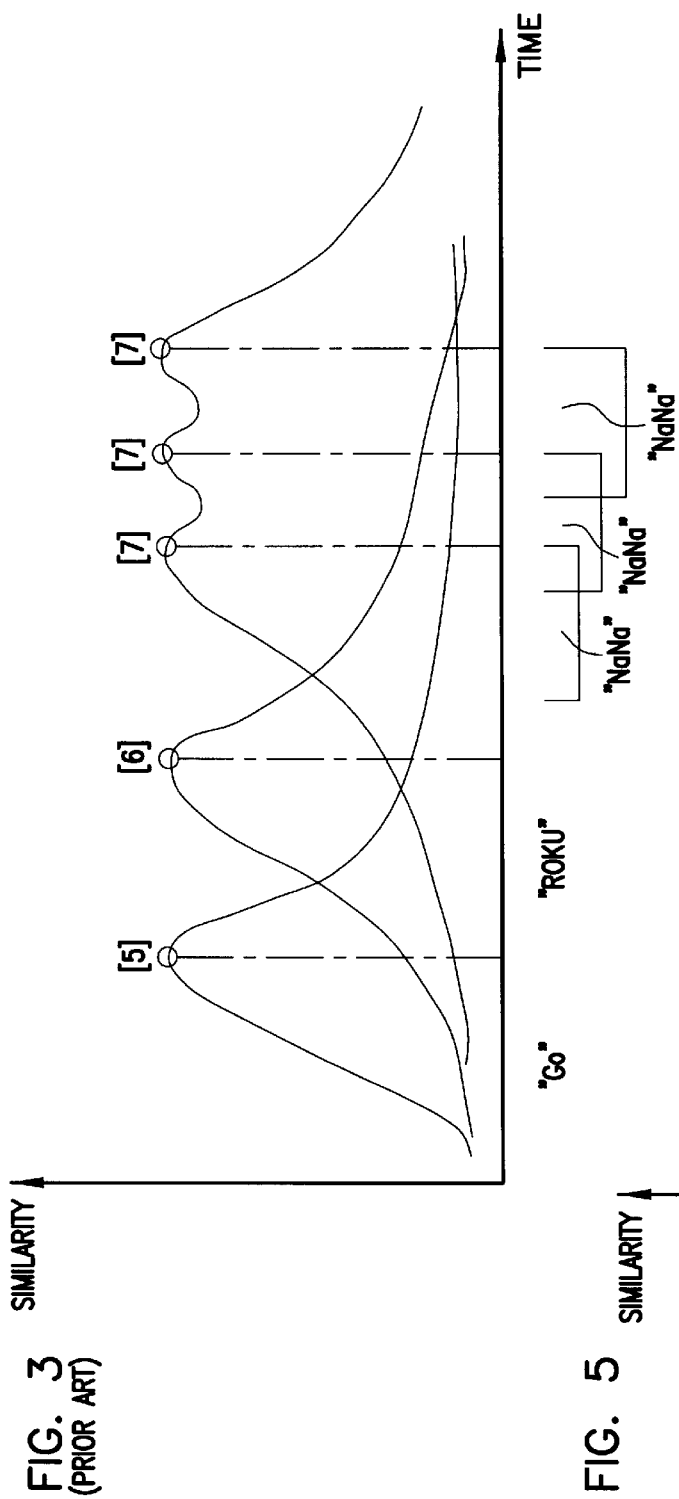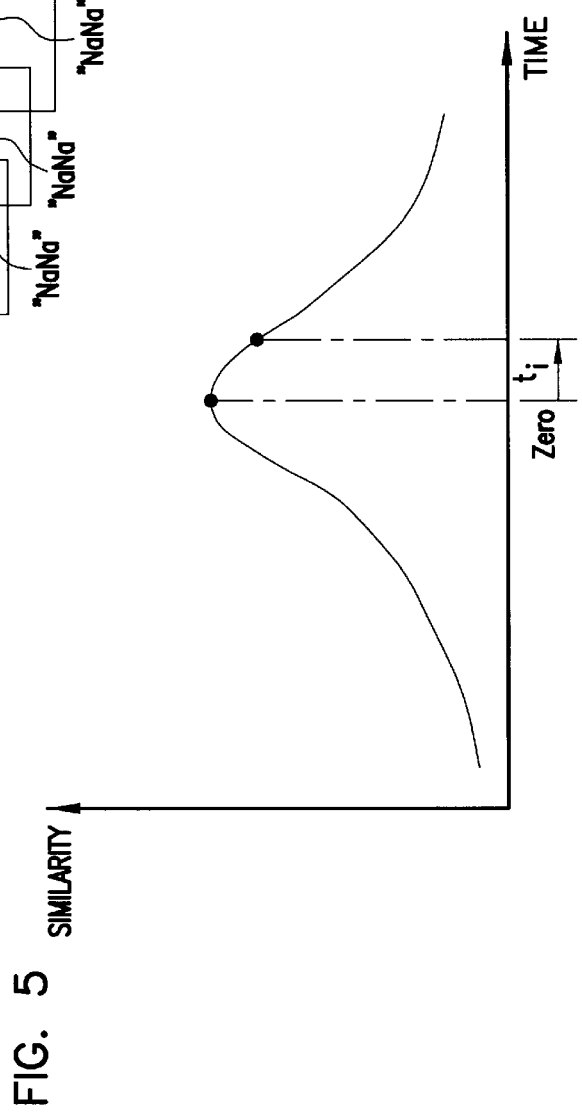
FIG. 3 (PRIOR ART)
FIG. 5

FIG. 6

| WORD | RESPONSE TIME |
|---|---|
| "zero" (ZERO) | 0.2 sec. |
| "ichi" (ONE) | 0.2 sec. |
| "ni" (TWO) | 0.2 sec. |
| "san" (THREE) | 0.2 sec. |
| "yon" (FOUR) | 0.2 sec. |
| "go" (FIVE) | 0.2 sec. |
| "roku" (SIX) | 0.2 sec. |
| "nana" (SEVEN) | 0.2 sec. |
| "hachi" (EIGHT) | 0.2 sec. |
| "ku" (NINE) | 0.2 sec. |

FIG. 8

| WORD | RESPONSE TIME |
|---|---|
| "zero" (ZERO) | 0.2 sec. |
| "ichi" (ONE) | 0.2 sec. |
| "ni" (TWO) | 0.2 sec. |
| "san" (THREE) | 0.2 sec. |
| "yon" (FOUR) | 0.2 sec. |
| "go" (FIVE) | 0.2 sec. |
| "roku" (SIX) | 0.2 sec. |
| "nana" (SEVEN) | 0.5 sec. |
| "hachi" (EIGHT) | 0.2 sec. |
| "ku" (NINE) | 0.2 sec. |

METHOD AND A SYSTEM FOR SUBSTANTIALLY ELIMINATING SPEECH RECOGNITION ERROR IN DETECTING REPETITIVE SOUND ELEMENTS

FIELD OF THE INVENTION

The current invention is generally related to a method and a system for substantially eliminating voice or speech recognition errors in detecting repetitive sound elements and more particularly related to a method and a system for marking the repetitive sound elements in a predetermined manner.

BACKGROUND OF THE INVENTION

In the prior art attempts, one of the speech recognition methods detects an end of each voice element. In such an endpoint detection method, a start and an end are determined in part based upon information on power. Each detected sound unit is then processed. Referring to FIG. 1, in a step S1, a recognition process is initiated, and in a step S2, an endpoint detection is performed on voice data so as to detect voice elements. In the step S2, a start of a voice element is generally determined based upon power information while an end is determined based upon a presence of a predetermined minimal period of silence. This end determination usually enables distinction between a voice element end and silence before a certain consonant as well as certain other silence in a word. In a step S3, the detected voice elements are then compared to a dictionary and an element that has the highest degree of similarity is selected. Lastly, the selected item from the dictionary is outputted as a result in a step 4.

The above described endpoint detection requires a certain predetermined silent period. In determining a voice element end, a period ranging from 250 milliseconds to 350 milliseconds is generally used. Since this method requires that for each potential ending, silence for the above described period has to be confirmed. In other words, this processing is not able to output a result for the above described period. Consequently, the method is considered to be rather slow in prior art. Although the above predetermined silence period was shortened so as to improve performance in a certain prior art system, an erroneous endpoint detection rate has increased since certain words include a short silent period. The erroneous endpoint detection problem is also compounded by the presence of certain speech which fills between words and does not necessarily have meaning. For example, when speech such as "ah" and "well" is uttered, words combined with the speech have a reduced degree of similarity.

In order to solve the above described problems of the endpoint detection method, referring to FIG. 2, a word spotting method has been used. In a step S11, speech recognition is initiated without detecting an end of speech recognition element. As soon as voice data is available, the inputted voice data is compared to a predetermined standard dictionary in a step S12. In a step S13, the result or the degree of similarity is further compared to a predetermined threshold value. If the result fails to exceed the predetermined threshold value, the above described steps are repeated. On the other hand, if the result exceeds the predetermined threshold value, the input voice data is outputted as recognition data in a step S14. Since the word spotting method generally renders an output without a delay for detecting an end, the method enables fast speech recognition. Furthermore, the word spotting method removes certain unnecessary speech and improves recognition accuracy.

Despite the above described advantages, the word spotting method is generally susceptible to speech recognition errors in detecting repetitive sound elements. For example, referring to FIG. 3, in the Japanese language, numbers, five, six and seven are respectively pronounced "go," "roku" and "nana." When "5677" is pronounced as shown, according to a known word spotting method, "go" and "roku" are correctly recognized. Since "nana" is repeated twice, because of continuous comparisons according to the word spotting method, "nana" is erroneously detected three times. It is desired that the above described erroneous detection of repetitive elements is substantially reduced while advantages of the word spotting are preserved.

SUMMARY OF THE INVENTION

In order to solve the above and other problems, according to a first aspect of the current invention, according to a first aspect of the current invention, a method of substantially eliminating an error in speech recognition, includes the steps of: modifying a response time for an entry having repetitive speech elements in a predetermined dictionary; inputting voice data; performing word spotting for matching a portion of the voice data with the entry of the predetermined dictionary so as to determine a similarity degree; and delaying to output a similarity degree upon detecting the repeated voice elements, wherein said word spotting substantially eliminating an erroneous additional detection of the repeated voice elements.

According to a second aspect of the current invention, a method of substantially eliminating an error in speech recognition, includes the steps of: adding a silent key at an end of an entry having repeated voice elements in a predetermined dictionary; inputting voice data; and performing word spotting for matching a portion of the voice data with the entry of the predetermined dictionary, wherein upon detecting the repeated voice elements, said word spotting substantially eliminating an erroneous additional detection of the repeated voice elements.

According to a third aspect of the current invention, a system for substantially eliminating an error in speech recognition, includes: a standard dictionary having a prolonged response time for an entry having repeated voice elements in a predetermined dictionary; an input unit for inputting voice data; and an extraction characteristic unit connected to said standard dictionary for performing word spotting for matching a portion of the voice data with the entry of the predetermined dictionary and outputting a similarity degree, wherein upon detecting the repeated voice elements, said word spotting substantially eliminating an erroneous additional detection of the repeated voice elements based upon the prolonged response time prior to outputting the similarity degree.

According to a fourth aspect of the current invention, a system for substantially eliminating an error in speech recognition, includes: a standard dictionary having a silent key for an entry having repeated voice elements in a predetermined dictionary; n input unit for inputting voice data; and an extraction characteristic unit connected to said standard dictionary for performing word spotting for matching a portion of the voice data with the entry of the predetermined dictionary and outputting a similarity degree, wherein upon detecting the repeated voice elements, said word spotting substantially eliminating an erroneous additional detection of the repeated voice elements based upon the silent key.

BRIEF DESCRIPTION OF THE DRAWINGS

FIG. 3 is a diagram illustrating a problem of erroneous speech recognition of repeated elements in word spotting.

FIG. 5 is a diagram illustrating a response time in word spotting.

FIG. 6 is a table illustrating a uniform response time.

FIG. 8 is a table illustrating varied response time.

DETAILED DESCRIPTION OF THE PREFERRED EMBODIMENT(S)

Figure 1:
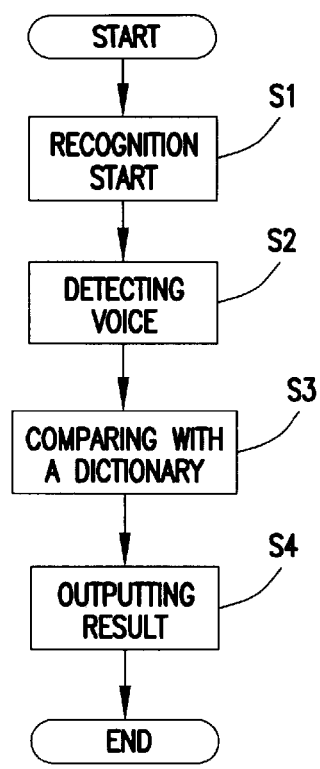
FIG. 1 is a flow chart illustrating steps involved in a prior art process of endpoint detection in speech recognition.
Figure 2:
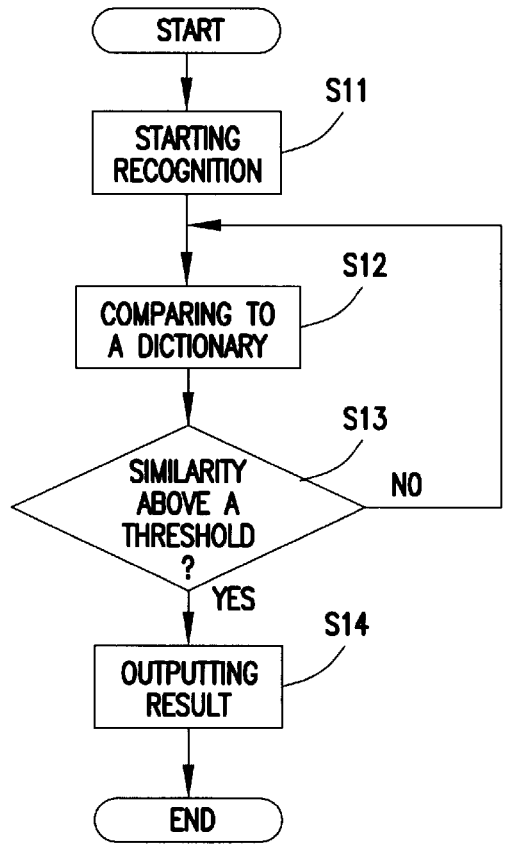
FIG. 2 is a flow chart illustrating steps involved in a prior art process of word spotting in speech recognition.
Figure 4:
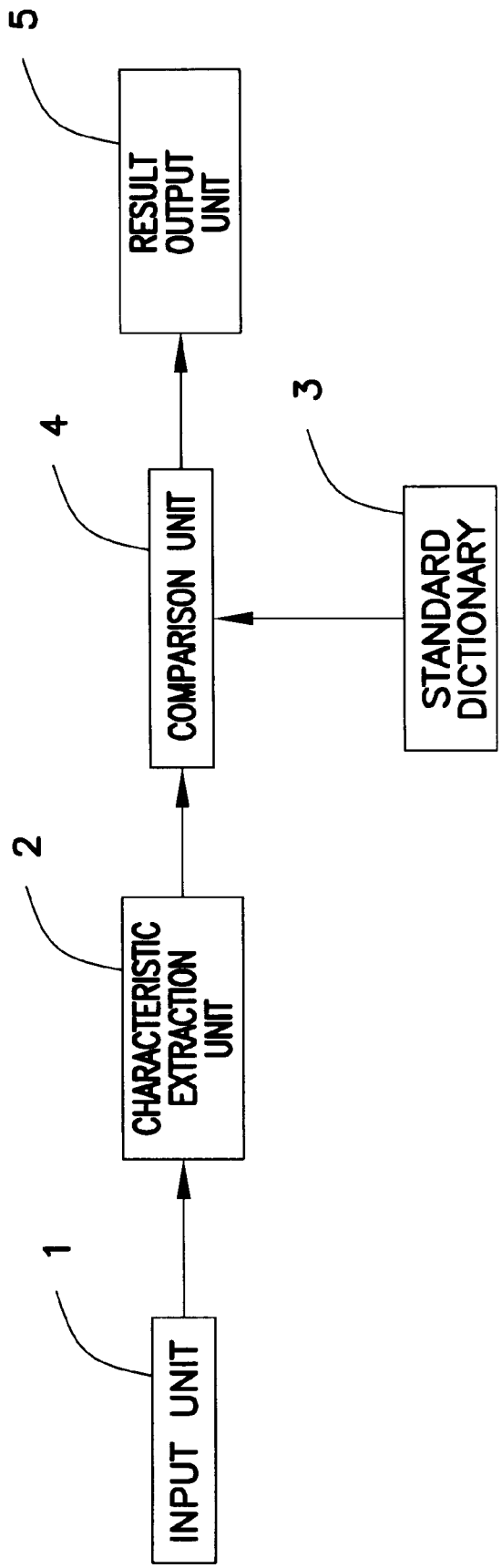
FIG. 4 is a block diagram illustrating a preferred embodiment of the speech recognition system for substantially reducing erroneous recognition of repetitive elements.

Referring now to the drawings, wherein like reference numerals designate corresponding structure throughout the views, and referring in particular to FIG. 4, one preferred embodiment of the system for substantially eliminating speech recognition errors in detecting repetitive sound elements according to the current invention includes an input unit 1, a voice characteristic extraction unit 2, a standard dictionary 3, a comparison unit 4 and a result output unit 5. The input unit 1 includes an input device such as a microphone and inputs voice data to be recognized. The voice characteristic extraction unit 2 extracts certain predetermined features from the voice data. The comparison unit 4 compares the extracted predetermined features to those previously stored in the standard dictionary 3. For example, the comparison unit 4 generates a similarity degree as a result of the comparison. Finally, the result output unit 5 determines whether or not the comparison result exceeds a predetermined threshold value and outputs a recognition result.

The above described preferred embodiment performs a word spotting method. One example of the word spotting method is a state transition model which yields the highest degree of similarity near an end on a voice element. According to the state transition model, the characteristic extraction unit 2 outputs power information such as TSP and cepstrum values which indicate power in a frequency area. The standard dictionary 3 contains the corresponding value for each voice element to be recognized. The comparison unit 4 compares the power information to those previously stored in the standard dictionary 3 and generates a similarity degree as a result of the comparison. Finally, the result output unit 5 determines whether or not the comparison result exceeds a predetermined threshold value and outputs a recognition result.

Now referring to FIG. 5, one example of a marker or a response time is illustrated. The Y axis indicates similarity while the X axis indicates time. When the Japanese word, "zero" meaning zero is uttered, the similarity degree is the highest after the pronunciation of the word is completed. However, it does not become clear whether or not the similarity degree indeed has the highest value at the end of the pronunciation unless a predetermined amount of time elapses. According to one preferred embodiment of the current invention, the predetermined amount of time is called a response time $t_i$ and indicates a period between a first point where the similarity value reaches the highest and a second point where the highest value is actually outputted.

Figure 7:
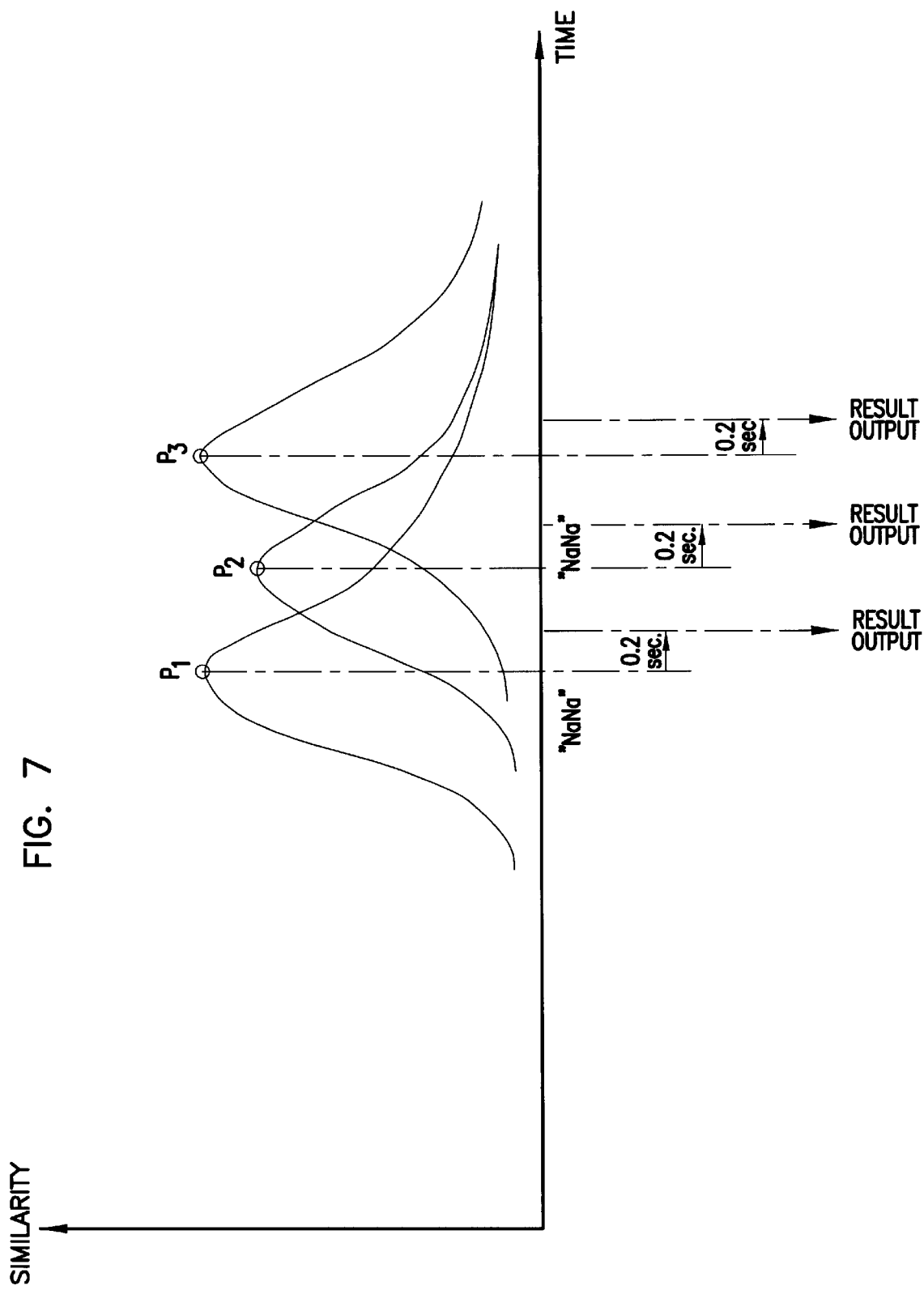
FIG. 7 is a diagram illustrating a problem of erroneous recognition of repetitive elements with the uniform response time in word spotting.

FIG. 6 is an exemplary table illustrating the above described response time for each entry in a standard dictionary. In this example, for each numeric word from zero to nine, the same response time 0.2 second is provided in a standard dictionary in addition to a predetermined characteristic values which are not shown. In the alternative, the response time is combined with the characteristic values in a predetermined manner. When the above exemplary table is used, now referring to FIG. 7, the previously described erroneous detection of repetitive elements such as "nana nana" still occurs since the response time of 0.2 second does not allow a similarity degree to come down when the first occurrence of "nana" ends and the second occurrence of "nana" starts. As shown, three peaks $P_1$, $P_2$ and $P_3$ of the similarity degree are obtained for two occurrences of "nana," and three occurrences of the word are consequently recognized.

Now referring to FIG. 8, one example of a preferred embodiment of the standard dictionary containing a prolonged response time according to the current invention is illustrated. In this example, for each numeric word from zero to nine except for seven, the same response time 0.2 second is provided in a standard dictionary in addition to a predetermined characteristic values which are not shown. For the word, seven or "nana," the response time $t_i$ is 0.5 second. The prolonged response time is either a maximal time for a practical measurement. In general, the longer the response time $t_i$, the more accurately the similarity degree is determined by substantially eliminating an undesirable effect of an adjacent meaningless word. In other words, when there is an additional peak within a response time $t_i$ after an initial peak in similarity degree occurs, the additional peak is usually thrown away as a meaningless word. When the response time $t_i$ is properly set, since the initial peak value is generally larger than the additional peak value, the additional peak representing the undesirable repetitive element portion is discarded. The proper maximal response time for words containing repetitive elements usually ranges from 0.5 second to 0.8 second. However, since a long response time results in slow speech recognition, for words without repetitive elements, the response time should be kept minimal.

Figure 9:
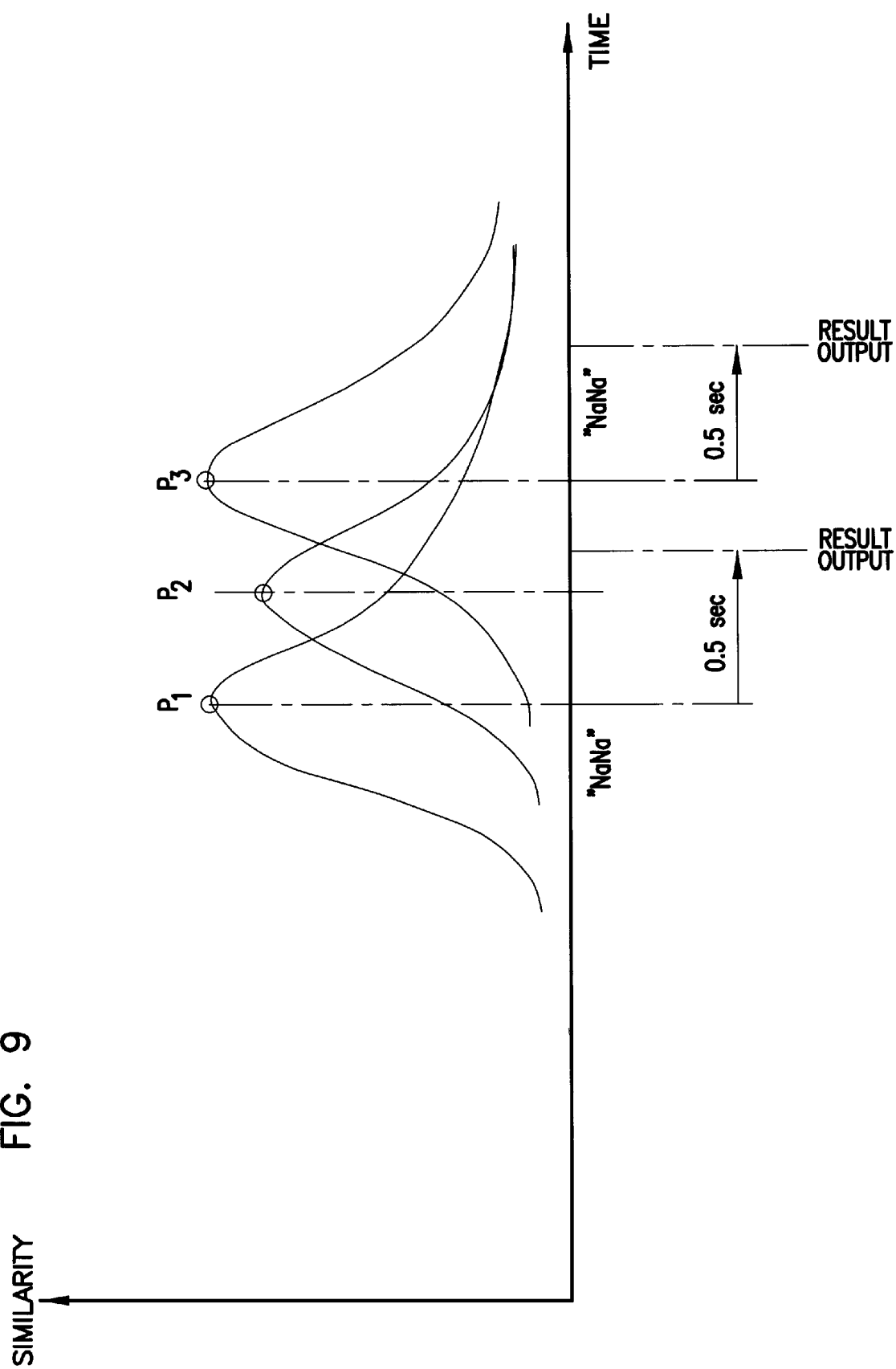
FIG. 9 is a diagram illustrating the reduction of erroneous recognition of repetitive elements with the varied response time in word spotting.

Based upon the above example, FIG. 9 further illustrates a desirable effect of the prolonged response time in recognizing repetitive voice input data. The Y axis indicates similarity degree while the X axis indicates time. When "nana" is repeated twice, although there are three peaks $P_1$, $P_2$ and $P_3$, because of the prolonged response time of 0.5 second, the second peak $P_2$ is smaller than the first and third peaks $P_1$ and $P_3$ Thus, the second peak representing "nana" is almost hidden by the first peak $P_1$ and is not recognized as a "nana" as represented by the first and second peaks $P_1$ and $P_3$.

Figure 10:
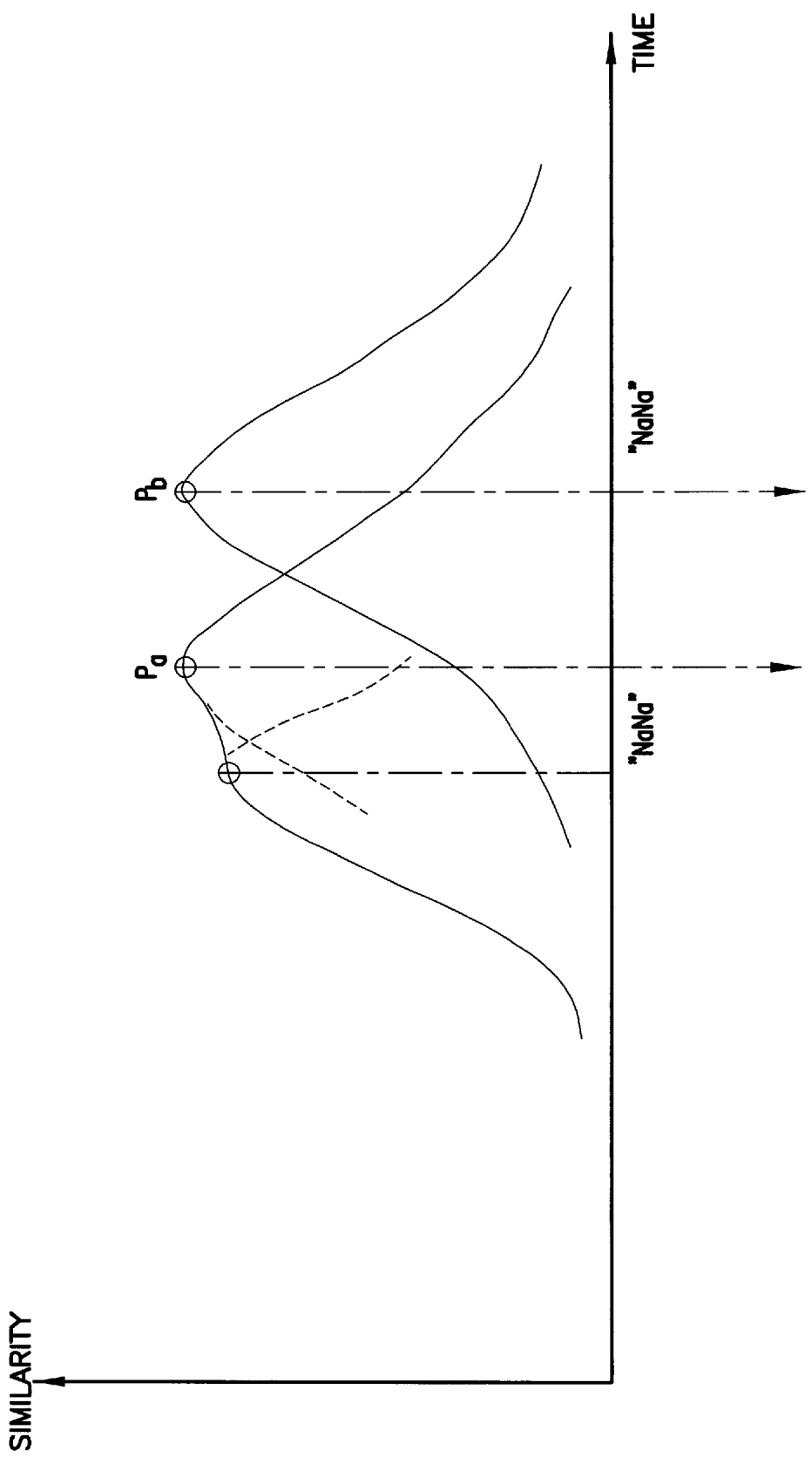
FIG. 10 is a diagram illustrating the reduction of erroneous recognition of repetitive elements with the silent key in word spotting.

Now referring to FIG. 10, a second preferred embodiment of the speech recognition system for substantially eliminating erroneous detection of repetitive elements according to the current invention includes a silent key in a standard dictionary. One specific example of the silent key includes "q" which is placed at the end of the word containing repetitive elements and a standard dictionary contains "nana-q." The silent key generally delays the word recognition due to a silent portion. The Y axis indicates similarity degree while the X axis indicates time. When "nana" is repeated twice, only two peaks $P_a$ and $P_b$ appear due to the silent key. Because of the delayed output, the third undesirable peak was eliminated.

Figure 11:
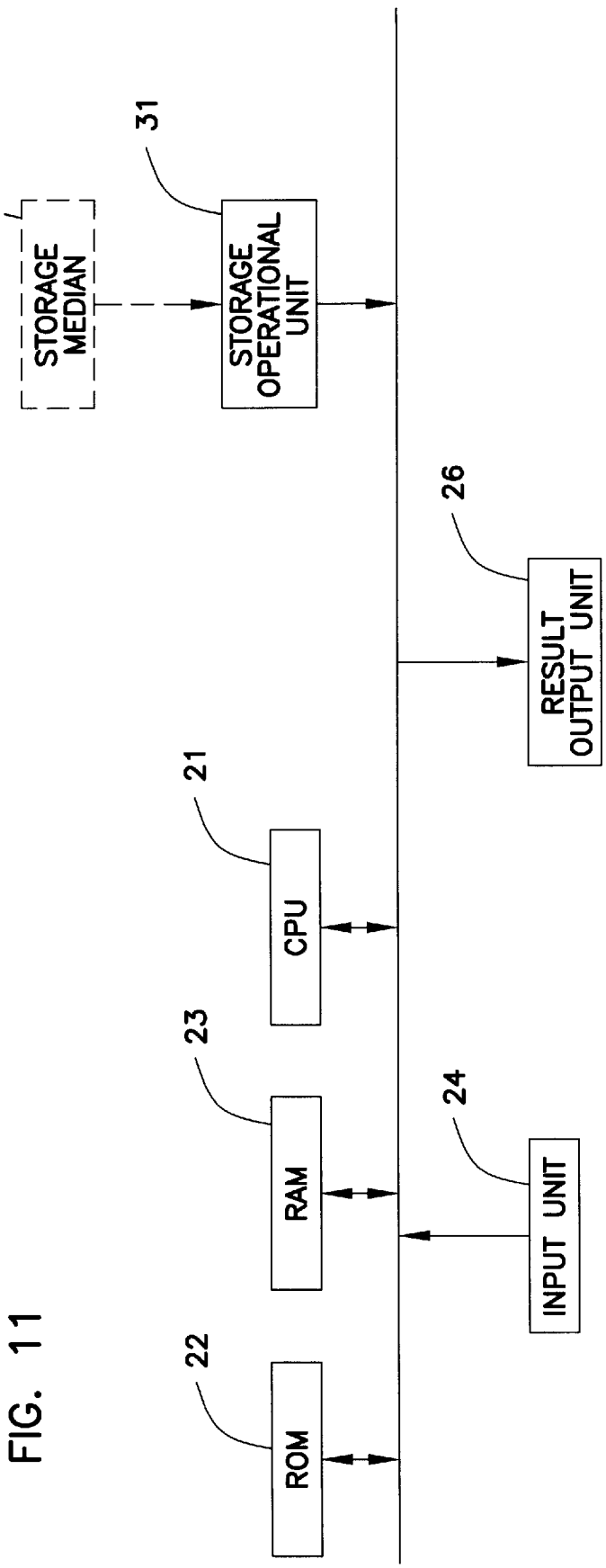
FIG. 11 is a block diagram illustrating another preferred embodiment of the speech recognition system for substantially reducing erroneous recognition of repetitive elements.

FIG. 11 is a block diagram illustrating a third preferred embodiment according to the current invention. The third preferred embodiment includes an input unit 24, a central processing unit (CPU) 21, a read only memory (ROM) 22, a random access memory (RAM) 23, a result output unit 26, a storage operational unit 31 and a storage medium 30. The result output unit 26 includes a display unit and a printer. The storage medium 30 includes a floppy disk, a compact disk (CD), and a memory card. Software residing in the storage medium is accessed by the storage operational unit 31 and is ran on the RAM 23. The access also includes a communication line. The CPU 21 and the software processes voice input data from the input unit 24 so that voice characteristics is extracted and the extracted characteristics is compared to those in the standard dictionary. In other words, third preferred embodiment of the system for substantially eliminating erroneous voice detection according to the current invention is generally implemented on a general purpose computer with a predetermined software.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the term in which the appended claims are expressed.

What is claimed is:

1. A method of substantially eliminating an error in speech recognition, comprising the steps of:
    a) modifying a response time for an entry having repetitive voice elements in a predetermined dictionary;
    b) inputting voice data;
    c) performing word spotting for matching a portion of the voice data with the entry of the predetermined dictionary so as to determine a similarity degree; and
    d) delaying to output a similarity degree upon detecting the repeated voice elements, wherein said word spotting substantially eliminating an erroneous additional detection of the repeated voice elements.

2. The method of substantially eliminating an error in speech recognition according to claim 1 wherein said response time is allocated for 0.2 second at the end of the entry.

3. The method of substantially eliminating an error in speech, recognition according to claim 1 wherein said response time is prolonged by 0.3 second for the entry having repetitive voice elements.

4. A method of substantially eliminating an error speech recognition, comprising the steps of:
    e) adding a silent key at an end of an entry having repeated voice elements in a predetermined dictionary;
    f) inputting voice data; and
    g) performing word spotting for matching a portion of the voice data with the entry of the predetermined dictionary, wherein upon detecting the repeated voice elements, said word spotting substantially eliminating an erroneous additional detection of the repeated voice elements.

5. The method of substantially eliminating an error in speech recognition according to claim 1 wherein said silent key is a predetermined letter.

6. A system for substantially eliminating an error in speech recognition, comprising:
    a standard dictionary having a prolonged response time for an entry having repeated voice elements in a predetermined dictionary;
    an input unit for inputting voice data; and
    an extraction characteristic unit connected to said standard dictionary for performing word spotting for matching a portion of the voice data with the entry of the predetermined dictionary and outputting a similarity degree, wherein upon detecting the repeated voice elements, said word spotting substantially eliminating an erroneous additional detection of the repeated voice elements based upon the prolonged response time prior to outputting the similarity degree.

7. The method of substantially eliminating an error in speech recognition according to claim 6 wherein said prolonged response time is approximately 0.5 second.

8. A system for substantially eliminating an error in speech recognition, comprising:
    a standard dictionary having a silent key for an entry having repeated voice elements in a predetermined dictionary;
    an input unit for inputting voice data; and
    an extraction characteristic unit connected to said standard dictionary for performing word spotting for matching a portion of the voice data with the entry of the predetermined dictionary and outputting a similarity degree, wherein upon detecting the repeated voice elements, said word spotting substantially eliminating an erroneous additional detection of the repeated voice elements based upon the silent key.

9. The system for substantially eliminating an error in speech, recognition according to claim 8 wherein said silent key is a predetermined letter.

* * * * *